United States Patent [19]

Johnson et al.

[11] Patent Number: 4,949,633
[45] Date of Patent: Aug. 21, 1990

[54] ANIMAL FEED BAGGING APPARATUS

[75] Inventors: William C. Johnson, Omaha, Nebr.; Mervin E. Aurand, Adrian, Mo.

[73] Assignee: Rand Farm Systems Inc., Adrian, Mich.

[21] Appl. No.: 304,418

[22] Filed: Jan. 30, 1989

[51] Int. Cl.⁵ .......................... A01F 25/16; B65G 3/04
[52] U.S. Cl. ...................................... 100/65; 100/100; 100/98 R; 100/145; 141/114
[58] Field of Search ................... 100/65, 94, 145, 146, 100/147, 148, 150, 98 R, 100, 144; 141/10, 71, 114

[56] References Cited

U.S. PATENT DOCUMENTS

3,687,061 8/1972 Eggenmueller et al. .
4,046,068 9/1977 Eggenmuller et al. ............... 100/65
4,308,901 1/1982 Lee .
4,310,036 1/1982 Rasmussen et al. .
4,337,805 7/1982 Johnson et al. .
4,621,666 11/1986 Ryan .
4,653,553 3/1987 Cox et al. ............................ 100/65
4,688,480 8/1987 Ryan .
4,724,876 2/1988 Ryan .

Primary Examiner—Frankie L. Stinson
Attorney, Agent, or Firm—Laney, Dougherty, Hessin & Beavers

[57] ABSTRACT

A livestock feed bagging machine includes a wheeled chassis having a feed stock receiving trough extending transversely across the front. An auger in the trough distributes the feed stock to a toothed drum which forces ground feed stock through comb fingers into a compression and shaping compartment. Compacted feed stock moves from the compression and shaping compartment through a feed stock discharge section into a flexible bag. An adjustable brake retards the movement of the chassis in a controlled reactive response to the discharge of feed stock into the bag.

6 Claims, 6 Drawing Sheets

ANIMAL FEED BAGGING APPARATUS

FIELD OF THE INVENTION

This invention relates to machines for compacting and shaping silage or other vegetative livestock feeds and feeding such feed stocks into an elongated, ground-supported flexible bag.

BACKGROUND OF THE INVENTION

Brief Description of the Prior Art

One method of feeding livestock which has found a high degree of acceptance to farmers is the loading of the feed stock into an elongated flexible tube made of weather resistant plastic, and feeding from this bag until the feed is exhausted. Several types of machines have been provided for loading the comminuted feed stock into the bags preparatory to feeding the livestock from the bag over a period of several months. Such machines, in general, include a housing which defines a compacting and forming chamber, and a throat or passageway communicating with this chamber. Upstream from the throat or passageway is a zone in which a cylindrical drum is located. This drum has a plurality of radially projecting teeth or tines, and is rotatably mounted in the housing of the apparatus. It functions to force the feed stock into the compacting and shaping chamber, and from that chamber, into the flexible bag. Generally a plurality of fixed stripper fingers are provided which cooperate with the teeth carried on the drum to clean these teeth as the teeth are rotated through the fixed fingers. In at least one type of silage bagging machine which has been proposed, an auger or screw conveyor is mounted in the trough into which the raw silage or feed stock is dumped, and this auger functions to distribute the feed in an even manner as it is fed to the teeth-carrying drum.

In machines of the type described, the elongated flexible agricultural bag is paid out from the rear end of the machine as the filling of the bag progresses. The apparatus which compacts the feed and forces it into the flexible bag is then allowed to move slowly away from the bag in a controlled fashion by means of a braking system which controls the rate at which the feeding apparatus moves away from the progressively filling bag.

These horizontally expansible, flexible feed stock storage bags have become widely used in some dairy and beef cattle areas as an alternative to permanent storage structures, such as barns or silos.

One type of apparatus which is currently in limited use for loading silage into such flexible bags is disclosed in U.S. Pat. No. 4,046,069 to Eggenmuller et al. In the Eggenmuller et al patent, a loading channel supports the forward portion of an unfilled bag, and guides the feed stock from a tine-carrying grinding drum which carries spirally arrayed tines which project radially from the outer periphery of the drum.

The feed stock is initially fed into a hopper of the apparatus. There it is acted on by a reciprocating member which forces the feed stock into the tine-carrying drum, and the teeth of this drum then force the stock through a forming chamber into a storage bag. A gate or backstop is held against the closed end of the storage bag with cables connected from the backstop to a drum carried on the Eggenmuller apparatus. A brake arrangement is used in conjunction with the drum to apply controlled and adjustable, controlled tension to the cables, so that during the filling of the storage bag, the resistance offered by the braking force will be overcome and the apparatus will slowly move away from the gate or backstop, allowing a new portion of the bag to be continuously filled.

In Johnson et al U.S. Pat. No. 4,337,805, an apparatus which resembles that shown in Eggenmuller U.S. Pat. No. 4,046,069 is disclosed. In the Johnson et al machine the teeth carried on the rotor or drum are disposed on the drum in randomly located groups. The feed is forced through a generally trapezoidally-shaped (in cross-section) compression tunnel, and from this, into the storage bag. A feeder roller is rotated in the bottom of a hopper in which it is located so as to push the silage rearwardly in the machine and into the tooth-carrying drum. A disc brake assembly is used for adjusting the resistance to cable payout from drums carrying cables extended to a backstop used to secure the flexible bag against horizontal movement. A sprocket drive is employed for driving the feeder roller, as well as the tooth-carrying drum.

Both the Eggenmuller et al and Johnson et al machines disclosed in the two above mentioned patents do not, in practice, distribute the feed stock material evenly across the full width of the apparatus, so that the bags are not completely filled, and voids and air pockets exist within the silage or feed stock material, and cause spoilage to occur at a relatively early time.

It has been generally recognized by those in the business of devising and building and using machines of the type described, that the conditions differ under which a particular feed stock charged to the apparatus may be uniformly compacted and fed in a uniform and consistent fashion into the flexible bags. The realization of such desiderata depends upon the weather, the time in the season, the time at which the silage material is cut and various other factors. These variables make it difficult to always achieve consistent and uniform compaction of the silage, and complete and uniform filling of the bags.

U.S. Pat. No. 4,724,876 to Ryan describes an apparatus by which vegetative feed stock, such as silage, can be ground and then discharged in a relatively uniform fashion in and to a flexible agricultural bag. The apparatus has a housing which defines a hopper, and a passageway is located between the hopper and a rotor which is rotatably mounted in the apparatus for advancing the feed stock from the hopper into the bag. A screw conveyor, or auger, is mounted ahead of a press drum or rotor and functions to distribute feed stock oppositely along the length of the screw conveyor, or auger. This aids in eliminating mounding of the feed stock in the hopper. The auger, or screw conveyor, is, however, very small in relation to the size of the press rotor employed, and some difficulty is encountered in handling large amounts of feed stock and silage which may be dumped into the hopper on top of the screw conveyor at a single time. Inserts are provided on tapered walls of the hopper in order to divert the flow of the feed stock toward the central rotational axis of the press rotor, and these inserts cooperate with the rotor and the screw conveyor to prevent excessive accumulations of quiescent feed stock in the vicinity of the press rotor.

Additional patents which show machines for filling agricultural bags, and which are of the general type here described are U.S. Pat. Nos. 4,310,036; 4,308,901;

3,687,061; 4,621,666 and 4,688,480 and Canadian Pat. No. 1,243,241.

BRIEF DESCRIPTION OF THE PRESENT INVENTION

The present invention is an improved apparatus for emplacing particulate vegetable animal feed, such as silage, in an elongated, flexible ground-supported bag so that the bag is more uniformly packed and supported in a configuration which stretches the bag to a minimum extent, and allows the animal feed to be more efficiently fed to livestock from an open end of the bag.

Broadly described, the bagging machine includes a chassis having a towing tongue at a forward side, a rear side and ground engaging wheels facilitating movement. Mounted on the chassis is a variously compartmented hood or housing through which livestock feed, such as silage, is moved from front to rear. At the forward end of the housing, a feed receiving trough extends transversely across the chassis and carries a reversely flighted auger for moving centrally deposited feed stock from a central point laterally outwardly toward opposite ends of the trough in a uniform manner, and concurrently, toward the rear of the chassis.

Silage or other feed stock moved rearwardly by the auger enters an arcuate drum pan, and is here engaged by teeth carried on an elongated, generally cylindrical rotary drum. The teeth of the drum shear some of the feed stock across a shearing edge at the intersection of the drum pan and the silage receiving trough. The drum teeth also perform a distributing function by spreading the silage evenly between the tips of the teeth and the concave, upwardly facing surface of the arcuate, concave drum pan. The subdivided feed stock is forced from the drum pan into the entrance throat of a compression or compaction and shaping chamber. Comminuted animal feed passes into the compaction and forming chamber over a raised arcuate lifting step. As the animal feed is forced into the compaction and forming chamber, it is compressed and is shaped by the geometric configuration of the chamber to remove air and compact the feed into a substantially trapezoidal cross-sectional configuration. In this form, it is forced through a discharge chamber at the rear of the housing and into an elongated, flexible ground supported feed bag. As the apparatus moves forward at a rate controlled by a braking subassembly, compacted animal feed is continuously fed into the bag until it is filled over substantially its entire length. A retractable floor assembly is provided in the bottom of the housing at a location which facilitates rapid and efficient cleaning of the machine after it has been used for bagging animal feed.

An important object of the invention is to provide an improved apparatus for uniformly emplacing animal feed into an elongated, ground supported flexible bag so that voids and air spaces within the filled bag are minimized.

A further object of the invention is to provide an apparatus for feeding animal feed into a flexible bag, which apparatus accomplishes a more uniform comminution of bulk feed stocks, and the subdivided feed is fed into a flexible feed bag by the apparatus at a more uniform rate.

Another object of the invention is to provide an improved animal feed comminuting apparatus for feeding ground animal feed stocks into a flexible bag, with the apparatus being provided with a retractable floor which can be retracted after use of the apparatus to permit the interior of the machine to be thoroughly cleaned.

Another object of the invention is to provide a silage bagging apparatus which is characterized in having a longer and more trouble-free operating life than such machines as they have been previously constructed.

Additional objects and advantages of the apparatus of the invention will be apparent from the following detailed description of a preferred embodiment of the apparatus, when considered in conjunction with the accompanying drawings which illustrate such preferred embodiment.

DETAILED DESCRIPTION OF A PREFERRED EMBODIMENT OF THE INVENTION

Figure 1:
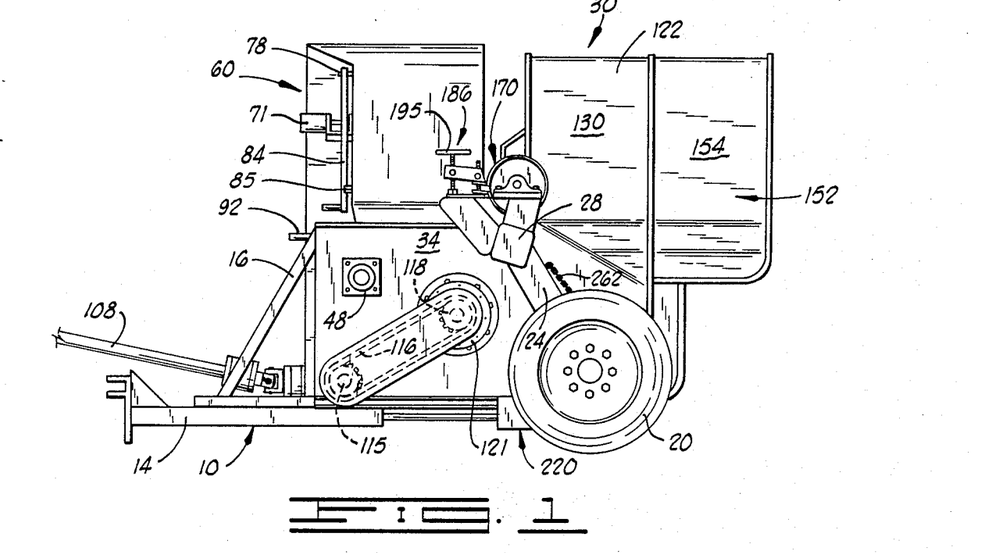
FIG. 1 is a side elevation view of the animal feed bagging apparatus of the present invention.

Referring initially to FIG. 1, the animal feed bagging apparatus of the invention includes a chassis designated generally by reference numeral 10. The chassis 10 includes a framework 12 (see FIG. 4) which has located at the forward end thereof, a towing tongue 14 by which the apparatus may be towed behind an agricultural tractor or other vehicle equipped with a power take-off shaft and having a hydraulic accessory power capability. The towing tongue 14 is braced with a pair of diagonal braces 16 and 18. The chassis 10 is preferably mounted upon a pair of ground-engaging wheels 20 and 22 to permit the apparatus to be easily towed by a tractor. The wheels 20 and 22 are supported on a pair of downwardly depending struts 24 and 26 which project downwardly from a transversely extending main or primary cross beam 28.

Mounted upon the chassis 10 and projecting upwardly therefrom is a hood structure or housing designated generally by reference numeral 30. The housing 30 includes a forward section 32 which is located between a pair of generally parallel, horizontally spaced, side plates 34 and 36. At the forward side of the side plates 34 and 36, a transversely extending, upper arcuate wall portion 38 projects downwardly and rearwardly and is joined at a lower rearward edge 39 to an arcuate lower wall portion drum pan 40 which extends rearwardly and defines an elongated pan for closely cradling a comminuting drum, hereinafter described (see FIGS. 2 and 8).

Figure 2:
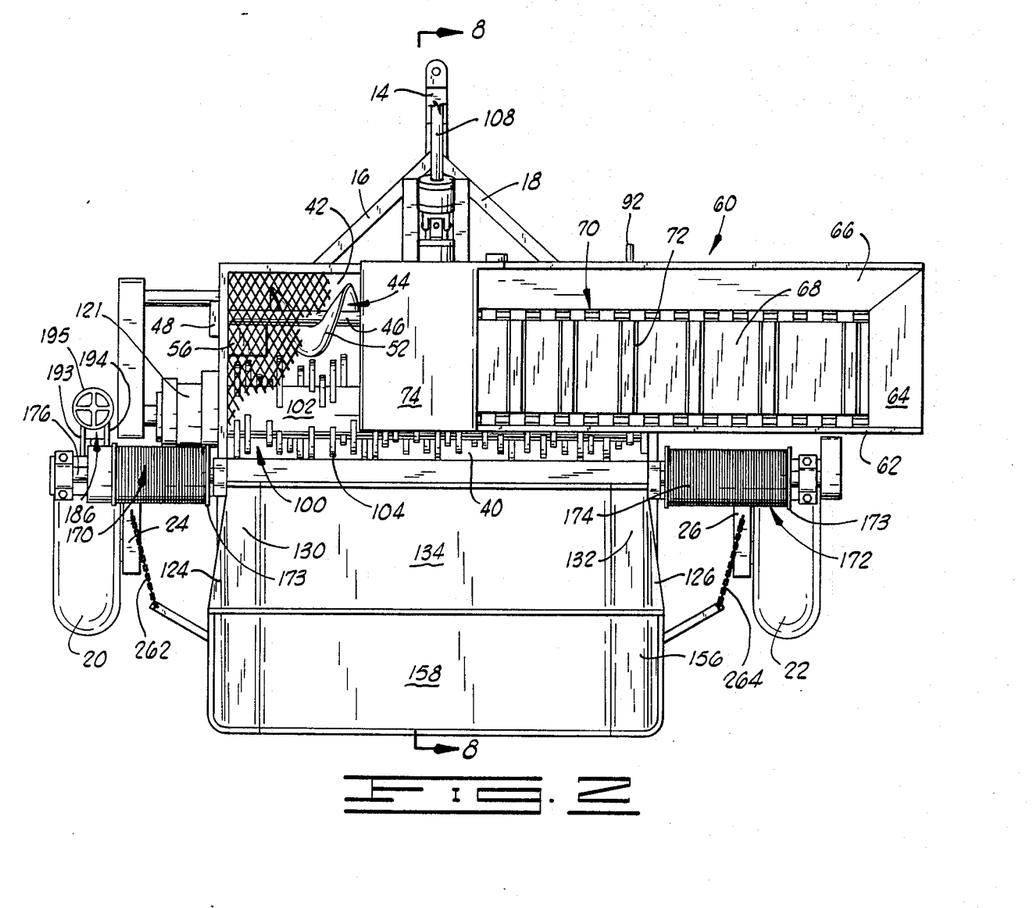
FIG. 2 is a plan view of the animal feed bagging machine of the invention.
Figure 12:
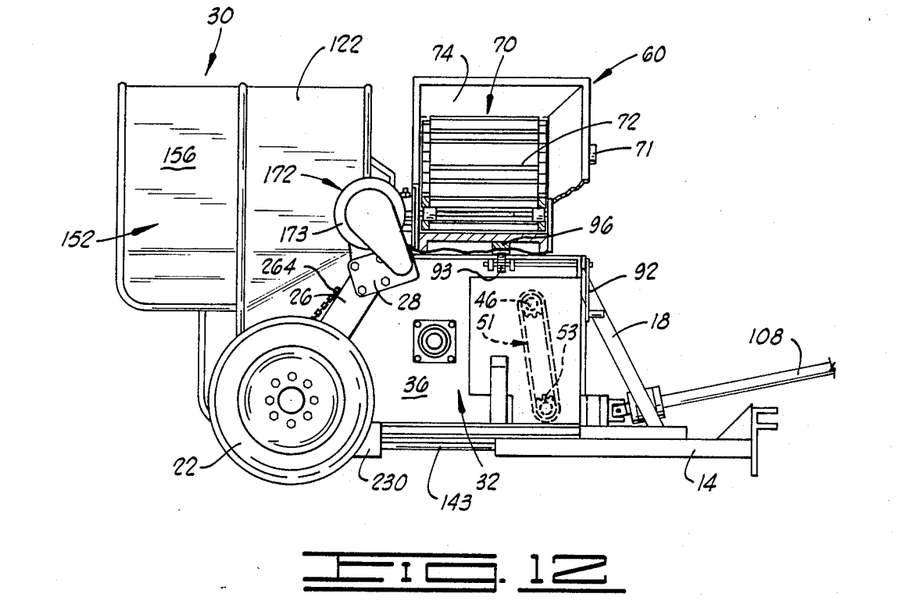
FIG. 12 is a side elevation view similar to FIG. 3, but with certain parts broken away, and certain parts shown in section for clarity of illustration.
Figures 13, 14:
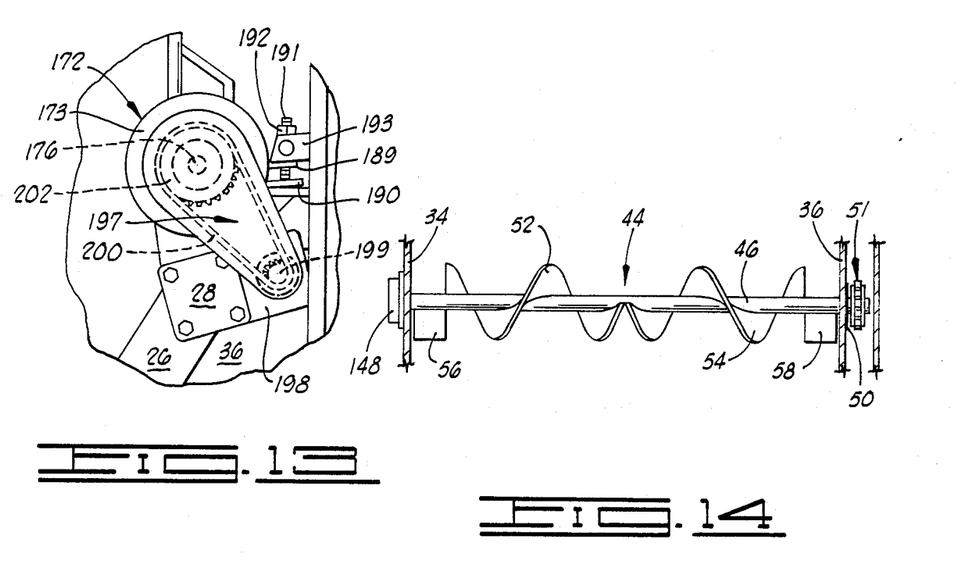
FIG. 13 is a side elevation view of a hydraulic reel rewinding assembly utilized in the bag filling apparatus.
FIG. 14 is a schematic illustration of an auger subassembly used in the bag filling apparatus.

The transversely extending upper arcuate wall portion 38 forms a forward wall portion and a floor for an elongated auger chamber 42 which contains an elongated auger subassembly, designated generally by reference numeral 44. The auger subassembly 44 is best illustrated in FIGS. 2 and 14, and includes an elongated shaft 46 having its opposite ends rotatably supported in journals 48 and 50. The elongated shaft 46 is driven in rotation by a chain and sprocket linkage 51 connected to a cross-shaft 53 (see FIG. 12) which is hydraulically powered from the towing vehicle through a mechanical linkage hereinafter described. The top of the end portions of the auger chamber 42 are covered by expanded metal ground plates 55, one of which is shown in FIG. 2.

As shown in FIG. 14, the auger subassembly 44 further includes a pair of reversely turned helical blade flights 52 and 54 which meet in the center of the auger shaft. At the opposite ends of the shaft 46, a pair of radially extending paddles or flaps 56 and 58 are secured to the shaft and project radially outwardly therefrom on the opposite sides of the shaft from the sides upon which the respective auger flights terminate.

Figure 8:
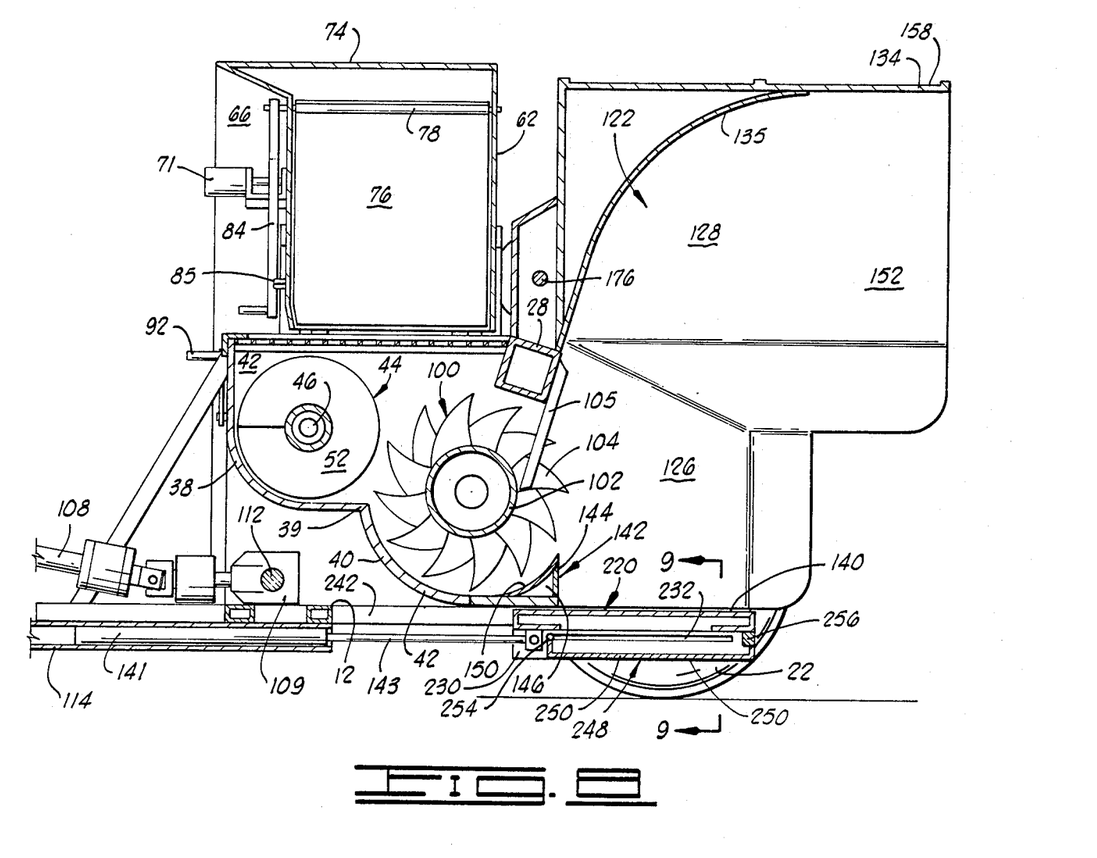
FIG. 8 is a sectional view taken long line 8—8 of FIG. 2.

It will be noted in referring to FIG. 8 that the auger flighting, made up of the counterturned flights 52 and 54, extends radially outwardly to a location where the radially outer cutting edges of the auger flights are spaced only from about one-fourth inch to about two inches from the upper arcuate wall portion 38. A radial spacing of about one-half inch at this location is preferred. Lumps or globs of grain or other silage material fed into the auger subassembly 44 at the center thereof is broken up as the flights of the auger force the grain into the narrow space between the outer tips of the auger flights and the upper arcuate wall portion 38.

Figure 3:
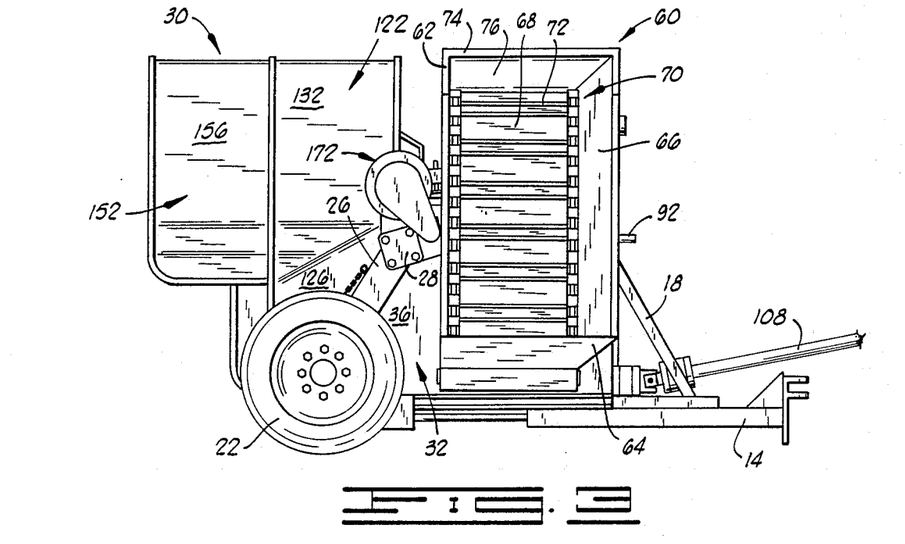
FIG. 3 is a side elevation view showing the opposite side of the animal feed bagging machine from that which is shown in FIG. 1.
Figure 4:
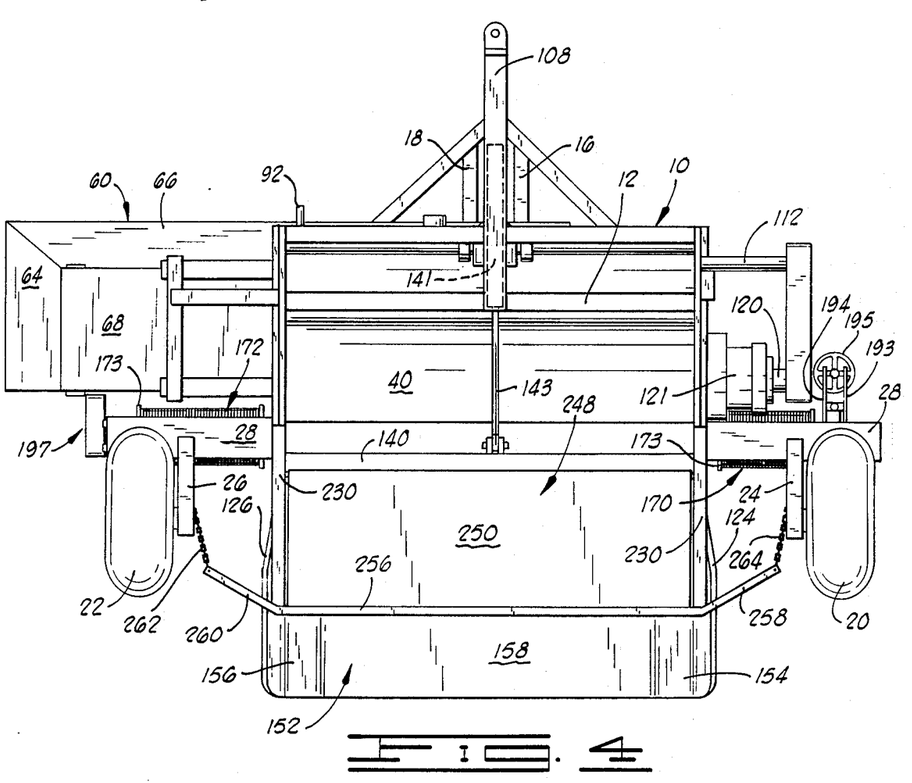
FIG. 4 is a bottom plan view of the animal feed bagging machine of the invention.

For purposes of feeding grain or other vegetative feed stock to the bagging machine, an elongated feed conveyor subassembly is provided as an optional but preferred portion of the apparatus, and is denominated generally by reference numeral 60. The feed conveyor subassembly 60 is probably best illustrated in FIGS. 2, 3 and 5. The feed conveyor subassembly 60 includes a rear wall 62, an inwardly inclined outer wall 64 and an inclined forward wall 66 (see FIG. 2). The feed conveyor subassembly 60 also includes a bottom wall 68 as illustrated in FIG. 4.

Mounted within the open topped chute which is formed by the back wall 62, front wall 66, outer wall 64 and bottom wall 68 is an elongated endless conveyor, designated generally by reference numeral 70. The conveyor 70 is trained over suitable sprockets (not visible) and is hydraulically driven by a suitable hydraulic motor 71 powered from the tractor, or towing vehicle. The conveyor 70 has a plurality of upwardly projecting flanges or cleats 72 spaced therealong for engaging the silage or the like to move this material into the bagging machine of the invention.

Adjacent the upper and inner end of the elongated feed conveyor subassembly 60, a top plate 74 extends across and closes the upper side of the conveyor subassembly. Within the enclosed space formed by the affixation of the top plate 74, a variably positioned deflector wall 76 is placed in the path of silage or other feed material moving on the conveyor 70, and disposed at the end of the conveyor where the conveyor passes around a sprocket. The deflector wall 76 functions to guide and direct the feed stock downwardly in gravitational fall into the path of the rotating auger subassembly 44 at a central location.

As shown in FIG. 8, the upper edge of the deflector wall 76 is secured to a fore-and-aft shaft 78 which extends through the front and back walls of the conveyor housing. The fore-and-aft shaft 78 is connected to an external, downwardly projecting handle 84. The handle 84 is accesible to the operator of the apparatus on the outer side of the housing of the feed conveyor assembly 60 so as to permit the angle made by the deflector plate 76 with the vertical to be adjusted. This adjustment capability is important to the achievement of optimum deposition of vegetable animal feed stocks at substantially the center of the auger subassembly 44. The selected position of the handle 84 can be set by setting it into one of the notches of a rack 85.

Figure 5:
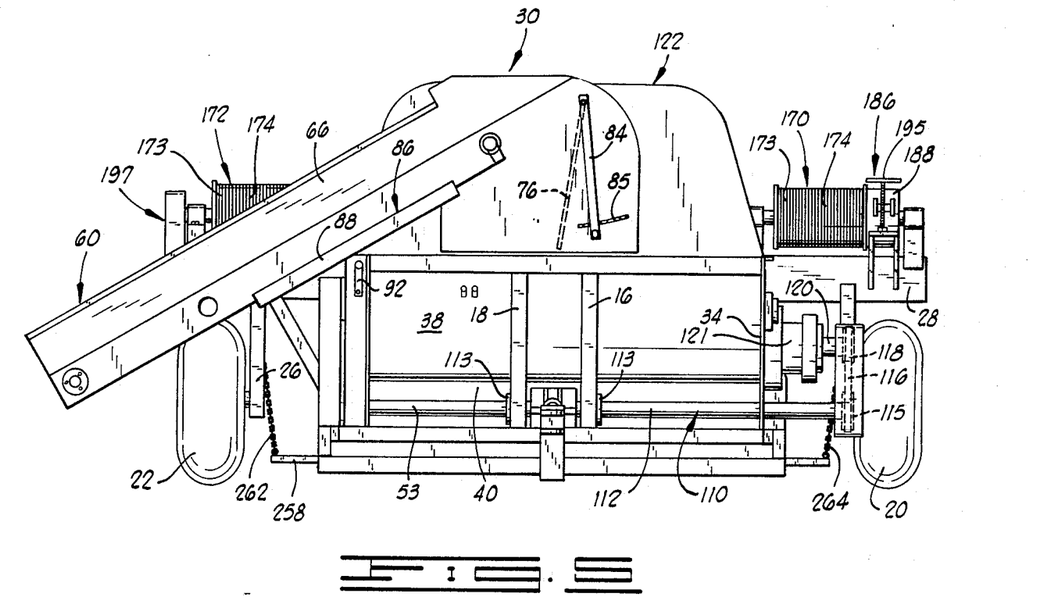
FIG. 5 is a front elevation view of the animal feed bagging machine of the invention.

In order to permit the elongated feed conveyor subassembly 60 to be moved from a relatively low, laterally extending feed pick-up position, as shown in FIG. 5, to an elevated, transport or over-the-road position, a trackway subassembly 86 is provided, and includes a pair of parallel, upwardly and inwardly extending track runners 88 in which the conveyor subassembly 60 is slidably mounted. A suitable crank 92 is provided, and is used to drive a suitable toothed gear 93 which engages a rack 96 carried on the lower side of the elongated feed conveyor subassembly 60 (see FIG. 12) to cause the subassembly to move upwardly and inwardly into an over-the-road transport position.

Figure 11:
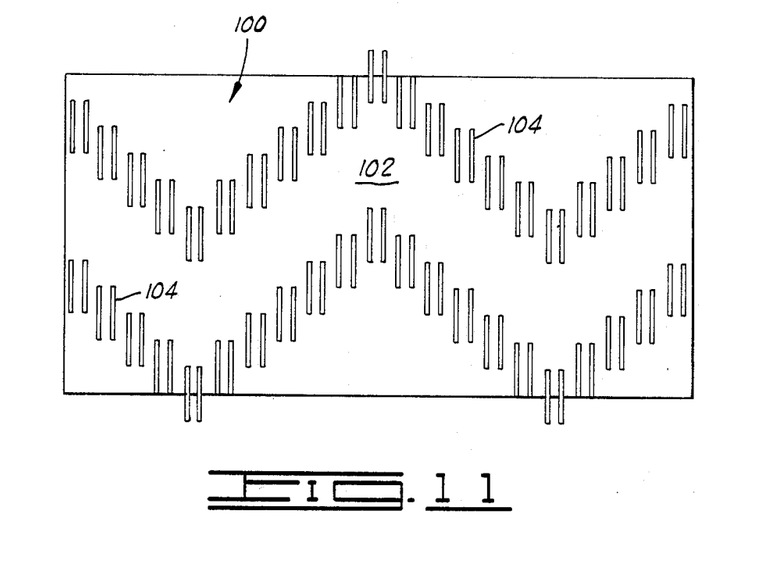
FIG. 11 is a diagrammatic illustration of how the teeth are arrayed on the feeding drum.

The arcuate lower wall portion or pan 40 provides a confining element which cooperates with an elongated comminuting drum subassembly, designated generally by reference numeral 100. The comminuting drum subassembly 100 includes an elongated drum 102 which carries, projecting radially outwardly from its outer periphery, a plurality of pairs of teeth or tines 104. The pairs of teeth 104 are arranged on the drum 102 in a sine wave array, with a pair of the sine waves of teeth being disposed 180° out of phase from each other around the periphery of the drum (See FIG. 11). As will be noted in FIG. 8, the teeth 104 have arcuate leading and trailing edges in order to more efficiently move and distribute the feed material being fed into the drum subassembly from the auger subassembly 44. A plurality of spaced stripper fingers 105 have their upper ends welded to the cross beam 28 and project downwardly so as to collectively form a comb through which the teeth 104 pass as the drum rotates.

It will be noted that at the location where the arcuate lower wall portion or pan 40 meets the transversely extending upper arcuate wall portion 38 at an angle of substantially 90°, a shearing edge 39 is formed which aids the auger subassembly 44 and the drum subassembly 100 in comminuting and distributing the feed material fed into the apparatus. The rotational axes of the drum 102 and of the shaft 46 of the auger subassembly 44 extend parallel to each other and transversely across the bagging apparatus. The clearance between the teeth 104 and the arcuate lower wall portion or pan 40 is from about one-half inch to about one and one-half inch, with a clearance of about one inch being preferred. Moreover, it is preferable that the circumferential extent of the pan 40 be such that it extends upwardly, at its leading (forward) side, to a horizontal plane extended through the center of the rotational axis of the drum 100, and that the pan terminates (at its rear edge) well to the rear of a vertical plane extended downwardly through the rotational axis of the drum.

In order to drive the drum subassembly 100 in a counterclockwise direction as viewed in FIG. 8, a power take-off shaft 108 from the towing tractor 107 is provided, and is denominated by reference numeral 108. The power take-off shaft 108 drives through a right angle gear box 109 in which are located gears (not shown) which drive a cross shaft linkage 110 which extends transversely across the feed bagging apparatus at the front of the chassis. The cross shaft linkage 110 includes, in addition to the left shaft section 53, a transversely extending right shaft section 112 (See FIG. 5). The shaft sections 53 and 112 are connected to the right angle gear box through flex couplings 113. The transversely extending right shaft section 112 extends through the wall section 34 and carries a drive sprocket 115 on its outer end spaced laterally from the chassis. The drive sprocket 115 engages a belt or chain 116 which extends to, and drivingly engages, a driven sprocket 118 (see FIG. 5). The sprocket 118 is secured to the outer end of a stub axle or shaft 120 which is drivingly connected to a planetary gear 121 located on the side of the housing 121.

Figure 6:
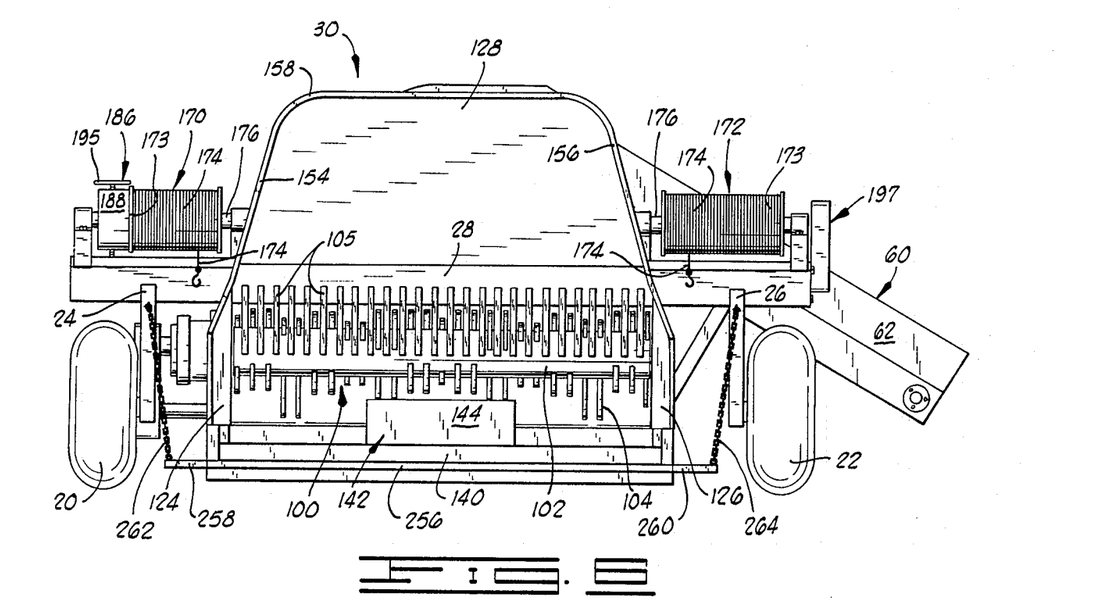
FIG. 6 is a rear elevation view of the animal feed bagging machine of the invention.

Spaced rearwardly on the chassis 10 from the comminuting drum subassembly 100 is a compression and forming chamber designated generally by reference numeral 122. The compression and forming chamber 122 includes a pair of lower side walls 124 and 126 which diverge outwardly, as shown in FIGS. 2, 4 and 6, and form a throat opening into the trapezoidally shaped upper portion 128 of the compression and forming chamber. The upper portion 128 of the chamber 122 is best illustrated in FIG. 8.

The trapezoidally shaped upper portion 128 of the chamber 122 is formed by a pair of upwardly converging upper side wall portions 130 and 132, as illustrated in FIGS. 1 and 2. The trapezoidally shaped upper portion 128 of the compression and forming chamber 122 also has a transversely extending, substantially horizontal top wall 134 which joins the convergent side walls 130 and 132 at their upper edges. Additionally, the upper portion 128 of the compression and forming chamber 122 has a forward wall 135 which is arcuate and is generally inclined at a mean angle of about 15° to the vertical. At its upper end the forward wall merges with the top wall 134, and at its lower edge it is joined to the main cross beam 28. The shape of the compression and forming chamber 122 is important to the efficient operation of the apparatus of the invention. This configuration assists in assuring that a flexible bag extending rearwardly from the apparatus will be uniformly and completely filled with comminuted and compacted animal feed material passed through the apparatus into the bag.

Figure 9:
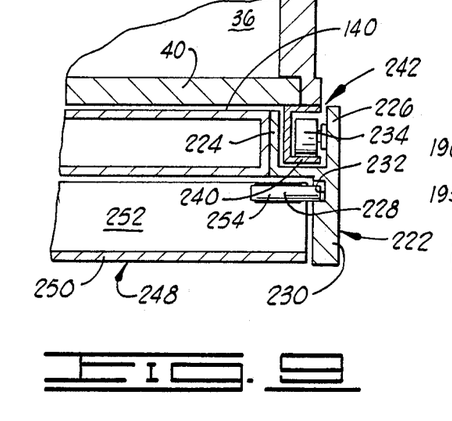
FIG. 9 is a sectional view of a structural detail taken so as to show how the retractable floor and bag pan forming a part of the invention are, in part, constructed.

The compacting and forming chamber 122 also has a rectangular retractable floor 140 forming the bottom of the chamber. The retractable floor 140 is illustrated in FIGS. 1, 4 and 9. The retractable floor 140 is a part of a retractable floor subassembly which also includes a bag pan, and which is hereinafter described in greater detail. The retractable floor 140 extends horizontally, and can be hydraulically reciprocated into a position in which it forms the entire bottom of the compression and forming chamber. Alternatively, it can be hydraulically retracted in a forward direction to open the bottom of this chamber, and facilitate thorough cleaning of the apparatus. The hydraulic extension and retraction of the floor 140 is accomplished by the use of a hydraulic cylinder 141 mounted on the towing tongue, and containing a piston having an extensible piston rod 143.

At the throat or entrance to the compression and forming chamber, and immediately adjacent the forward end of the retractable floor 140 when it is extended, is a material lifting step, designated generally by reference numeral 142. The material lifting step 142 includes a rearwardly facing back wall 144, a pair of parallel, lateral walls 146, and an arcuately shaped lift surface 150. The lift surface 150 is a concave, upwardly facing surface across which the central portion of the mass of comminuted or subdivided feed material passes in moving from the compressing drum subassembly into the compaction and shaping chamber 122. The lifting step is preferably from two to eight inches in height, and the arcuate lift surface preferably subtends an angle of from 15° to about 25°. The most preferred configuration of the lift surface 150 is an arcuate surface formed on a radius equivalent to the radius upon which the pan 40 is formed.

To the rear of the compression and shaping chamber 122, a discharge section is defined by a discharge cowl 152. The discharge cowl 152 is open at the bottom, and has a pair of upwardly convergent side walls 154 and 156. The discharge section further includes a top wall 158 which is aligned with the top wall 134 of the compression and forming chamber 122. The cross-sectional configuration of the discharge section is trapezoidal, and it is complementary in shape to the cross-sectional configuration of the compaction or compression and forming chamber 122.

For the purpose of controlling the pay out rate at which an elongated flexible synthetic resin feed bag is paid out from its stored inward position around the exterior of the compression and forming chamber 122 and around the discharge cowl 152, a pair of cable drum or reel subassemblies 170 and 172 are provided at opposite sides of the apparatus. The cable drum subassemblies 170 and 172 are mounted upon the transversely extending main beam 28 which projects horizontally across the apparatus from one side thereof to the other. The cable drum subassemblies 170 and 172 are mounted around, and are keyed to, a common transversely extending shaft 176 for rotation at the same speed about a common axis as the shaft is rotated. Each of the cable drum subassemblies 170 and 172 includes a cylindrically shaped cable drum 173 upon which is wrapped an elongated flexible cable 174 used for a purpose hereinafter described in greater detail.

Figure 10:
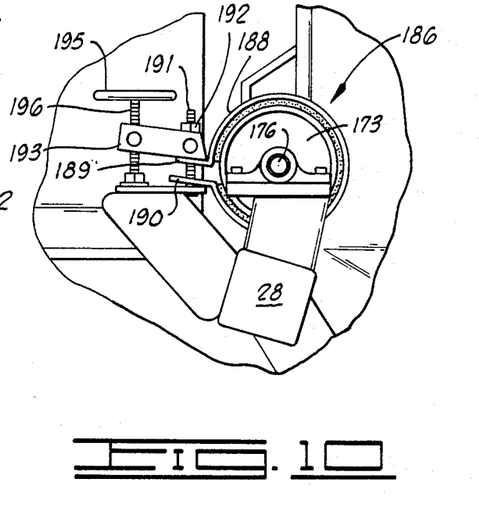
FIG. 10 is an enlarged side elevation view illustrating a band-type friction brake utilized in one embodiment of the invention.

The rate at which the cables 174 are paid out from the cable drums 173 is adjustably controlled by means of a manually set friction brake subassembly 186, depicted in FIGS. 1, 5 and 10. The friction brake subassembly 186 includes a generally circularly configured friction band 188 which is extended around a hub portion of one of the reels or drums 173, and is lined with a suitable friction element as shown in FIG. 10. The friction band 188 carries a pair of apertured flanges 189 and 190 at its two opposite ends which project radially from the band in a forward direction as shown in FIG. 10. The apertured flanges 189 and 190 function to receive therethrough a threaded adjusting shaft 191 which threads through a nut 192 carried between two friction brake subassembly plates 193 and 194. The manually operated friction brake subassembly includes a hand wheel 195 which is used to manually turn, or adjust, a threaded shaft 196 which projects through a second threaded nut (not shown) carried between the plates 193 and 194.

At the opposite end of the elongated common cable drum shaft 176 from the manually set friction brake subassembly 186, a cable re-winding subassembly 197 is mounted on the main support cross beam 28, as shown in FIG. 13. The cable re-winding subassembly 197 permits the cable reels or drums 173 to be concurrently rotated in a direction so as to retract and wind up the cables 174 which have been extended therefrom for the purpose of filling a flexible elongated agricultural bag in the manner hereinafter described. The cable re-winding subassembly 197 includes a hydraulic pump 198 which is powered from the towing vehicle 107. The hydraulic pump 198 drives a sprocket 199 which in turn drives an elongated endless chain 200 which passes around a substantially larger sprocket 202 keyed to the common shaft 176 to which the two cable reels or drums 173 are keyed for concurrent rotation. By means of the hydraulic motor 198, the cable reels 173 can be caused to rotate in a winding up direction to cause the cables thereupon to be wound up in one or more courses along the reels. In many instances, it will be desirable to utilize multiple courses of the cable reeled up on each of the drums.

Figure 7:
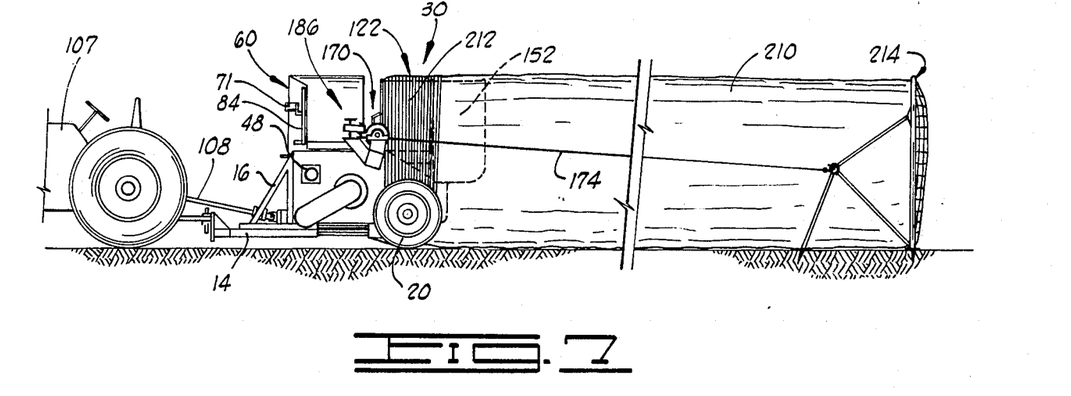
FIG. 7 is a diagrammatic side elevational view of the apparatus of the invention in use for filling an elongated flexible bag.

In FIG. 7 of the drawings, there is illustrated one of the elongated, flexible feed-receiving bags which is there denominated generally by reference numeral 210. The flexible feed-receiving bag 210 is illustrated as it appears as it is being fed off of the silage bagging machine, and filled with the feed stock material. It will be noted that a major portion of the bag 210 is encompassed in the folds or pleats 212 which are disposed around the outer side of the apparatus housing at about the location of the compacting and forming chamber 122. The bag 210 extends around the apparatus so that the bottom portion of the bag rests upon the upper side of a pan structure hereinafter described. Spaced from the bagging apparatus and at the closed end of the bag 210 is a stationary backstop or bag-anchoring subassembly designated generally by reference numeral 214. The backstop 214 functions to prevent the whole bag from moving longitudinally in either direction.

Reference has been earlier made herein to the retractable floor subassembly which includes the retractable floor 140. The retractable floor subassembly is generally designated by reference numeral 220 and is best illustrated in FIGS. 1, 4, 8 and 9 of the drawings. The retractable floor subassembly 220 includes, in addition to the generally rectangular retractable floor plate 140, a pair of elongated, horizontally extending roller brackets 222 which extend along each of the opposite sides of the retractable floor plate 140, and substantially parallel to each other. The elongated, horizontally extending brackets 222 are depicted in FIG. 9 in cross-section, and it will be noted that there is a U-shaped portion at the upper side of the bracket where there are a pair of parallel legs 224 and 226 which are interconnected by a web portion 228. There is also included in each of the brackets 222, a downwardly extending skirt or flange 230 which is provided with an inwardly facing elongated track groove 232.

Rotatably mounted to the inner side of each of the outer legs 226 of the U-shaped portion of each of the brackets 222 are a plurality of rollers 234. The rollers 234 are positioned to roll upon and track the lower flange 240 of a U-shaped channel track denominated generally by reference numeral 242. There are, of course, two of the channels tracks 242 which are disposed on opposite sides of the forming and compression chamber and extend parallel to each other at a location just below the level of the arcuate floor pan 40 as shown in FIG. 9. It will be perceived by reference to FIG. 9 that the floor 140 can reciprocate in a horizontal plane by movement of the rollers 234 in the channel tracks 242. As the floor undergoes such reciprocation, it carries with it, of course, the two parallel, elongated, horizontally extending brackets 222 located at opposite sides of the floor and positioned to receive the channel tracks 242 in the upwardly opening U-shaped portion of each of the brackets. The floor can be reciprocated between a closed position and an open, clean out position, as has been hereinbefore described.

The retractable floor subassembly 220 further includes a bag pan subassembly, designated generally by reference numeral 248. The bag pan subassembly 248 includes a flat, substantially rectangular bag pan 250 which is illustrated in section in FIGS. 8 and 9. The bag pan 250 includes an upwardly projecting flange 252 secured along the back edge of the bag pan. A pair of slide pins 254 are secured to this flange at opposite ends thereof, and are positioned to slide in the track grooves 232 formed in the downwardly projecting skirt or flange 230 of each of the elongated brackets 222. At the rear edge of the bag pan 250, as illustrated in FIG. 4, a transverse lift rod 256 extends across the trailing edge of the bag pan, and terminates in a pair of forwardly bent end portions 258 and 260. The forwardly bent end portions 258 and 260 of the lift rod 256 allow the bag pan 250 to be supported closely beneath the floor 140 by means of flexible chains or helical spring elements 262 and 264 disposed at opposite sides of the apparatus. Each of the chains or springs 262 and 264 has one end fixedly connected to one of the outer ends of the lift rod 256 at the terminus of the sections 258 and 260, and has its other end engaged with the struts 24 and 26, respectively.

The reciprocating retraction and extension of the rectangular floor 140 has been hereinbefore described. It should be further understood that at a time when a flexible bag 210 is being loaded on the apparatus in the position illustrated in FIG. 7 to facilitate the commencement of loading of silage o other feed stock into the bag, the forward end of the bag is folded onto the apparatus as shown in FIG. 7. The bottom portion of the bag is then placed on the upper side of the bag pan 250 in order to keep the bag from dragging on the ground. To accomplish this, the chains 262 and 264 are detached from their hooks 268 and 270 and the bag pan 250 is lowered. At this time, the rear end of the bag pan 250 can drop downwardly as the pan pivots about the slide pins 254. When the bag pan 250 has been moved downwardly at its rear end from the floor, the bag is placed on the upper side of the bag pan. Thereafter the bag pan 250 is returned to its location in close proximity to the under side of the retractable floor 140.

OPERATION

In utilizing the animal feed bagging apparatus of the invention, silage or other vegetative animal feed stock is dumped from a truck into the feed conveyor subassembly 60, and is moved upwardly thereon by the elongated conveyor 70 to the point where it is allowed to fall downwardly into the auger subassembly 44. In falling downwardly from the feed conveyor subassembly 60 to the auger subassembly 44, the feed stock is guided by the deflector plate 76. The angle at which this deflector plate 76 extends to the vertical can be adjusted by means of a handle 84 so as to make the feed stock fall to the center of the elongated shaft 46 which carries the reversely turned helical blade flights 52 and 54. By placing the feed stock at this location, and carefully controlling the manner in which it is distributed by the reversely turned flights of the auger, a high degree of assurance can be had that the feed stock material will be very evenly continuously distributed outwardly from the center of the auger subassembly toward the opposite sides of the chamber 42. At the opposite ends of the elongated shaft 46, the radially extending paddles or flaps 56 and 58 prevent the feed stock from balling up or chunking within the ends of the chamber 42, and accumulating against the walls 34 and 36.

From the auger subassembly 44, the feed stock moves rearwardly across the shearing edge 39 as the auger flights force the material in a rearward direction. At the shearing edge 39, any chunks or wads of the feed stock are broken up by the shearing action of the teeth 104 passing across the shearing edge as the drum 102 is rotated. The drum 102 is continuously rotated at a speed which is adjusted to optimize the rate at which the feed stock material is passed through the machine into the compacting and forming chamber 122. The feed stock is again subdivided and spread evenly across the pan 42 as the feed stock material is acted upon by the teeth 104 which are arrayed on the drum 102 as a pair of sine waves.

After the feed stock material has passed to the bottom of the pan 42, some of it is distributed on opposite sides of the material lifting step 142. The portion of the feed stock in the center of the moving mass, however, encounters the material lifting step 142 and is caused to move upwardly over the arcuately shaped lift surface 150. The inclusion of the material lifting step 142 in the apparatus is an important feature, since it gives definition to the feed stock material moving into the compacting and forming chamber 122, and avoids a build-up or blockage occurring at a central location in the mass of feed stock.

The feed stock material passed into the compacting and forming chamber 122 is compacted as it moves through the throat and between the lower side walls 124 and 126. Compaction continues as the feed stock is forced upwardly into the trapezoidally shaped portion 128 of the compression and forming chamber 122. The lower portion of the mass of feed stock is, of course, at this time supported on the retractable floor 140 of the retractable floor assembly 220. After passing through the compaction and forming chamber, where the mass of silage or other feed stock is shaped in a substantially trapezoidally shaped cross-sectional configuration without air pockets or voids, continued operation of the apparatus forces this shaped mass of feed stock material outwardly through the discharge cowl 152 and into the flexible bag 210 which is being expanded into the shape depicted in FIG. 7.

Prior to the commencement of the feed-through of silage or other feed stock material in the manner described, a large, elongated flexible agricultural feed stock-containing bag 210, having a forward end which has been folded compactly into radial or longitudinally extending pleats or folds 212 is placed upon the apparatus in the position such that the folds are illustrated in FIG. 7. In this position, the bag surrounds that portion of the hood structure or housing 30 which surrounds and defines the forward part of the compression and forming chamber 122. In placing the bag in this position, the lower portion of the bag 210 is initially placed on top of the bag pan 250 by pulling the bag pan outwardly after releasing the chains 262 and 264 from attachment at their upper ends to the struts 24 and 26. After the bag pan 250 is slid outwardly by movement of the slide pins 254 in the track grooves 232, the rear end of the pan is dropped downwardly and the lower portion of the bag can be placed thereon to prevent it from scraping against the ground during operation.

The closed back portion of the bag 210 is then secured in any suitable way to a backstop 214. This manner of anchoring or securing the closed end of the bag is well understood in the art. The flexible cables 174 from the cable reels 173 in each of the two reel assemblies 170 and 172 are then concurrently paid out after they have been hooked to the backstop as shown in FIG. 7. As feed stock or silage is directed through the apparatus and into the flexible bag 210, the rate at which the apparatus can slowly move forward upon the ground wheels 20 and 22 is controlled by the manually adjusted friction band brake subassembly 186.

The manually adjusted brake assembly 186 includes a friction band 188 which is preset and is adjusted during operation of the device to control the rate at which the cables 174 are permitted to unreel from the cable drums or reels 173. This in turn controls the rate at which the apparatus can move away from the backstop 214 and thus allow the bag to be pulled from the apparatus during filling. Adjustment of the brake 186 is accomplished by loosening or tightening the two nuts 192 and the second nut through which the threaded shaft 196 is extended and moved by rotation of the hand wheel 195. This system causes the brake band 188 to be uniformly constricted around the hub portion of the reel 173 upon which it is mounted so that there is an even breaking force applied over the entire circumferential extent of the hub, and the braking is even and uniform, rather than jerky and sporadic.

It should be pointed out that the manual adjusted brake assembly 186 which includes the friction band 188 enables the operator of the apparatus to finally adjust the braking action so that the degree to which the silage or feed stock is compacted as it moves into the bag 210 is closely and continuously adjusted. This aids in avoiding any voids or air spaces in the compacted feed stock placed within the bag.

Filling of the bag in the manner described continues until the bag is completely filled. At this time, the forward end of the bag which is now off of the apparatus, is suitably closed. The cables 174 can be detached from the backstop 214 and reeled back up on the reel assemblies 170 and 172 by means of the cable re-winding subassembly 197. This subassembly, driven by the hydraulic motor 198, simply functions to cause the cable drums 173 to undergo rotation in a direction to wind up the cables 174 thereon preparatory to a new bag filling operation to be conducted at a later time.

After the completely filled bag 210 has been detached from the apparatus, the retractable floor subassembly 220 is actuated to retract the rectangular floor plate 140.

This is accomplished by retracting the piston rod 143 into the cylinder 141 to pull the entire retractable floor assembly 220 forwardly by movement of the rollers 234 in the U-shaped channel tracks 242. After the floor plate 140 has been retracted to a position underneath the pan 40, access can be had to the interior of the compression and forming chamber 122 to permit it to be cleaned out. At this time, the teeth 104 of the drum subassembly 100 can also be cleaned, as can the stripper fingers 105.

From the forgoing description of the invention, it will be perceived that the present invention provides an improved apparatus for filling a flexible bag with silage or other vegetable feed stock material used for feeding livestock. Although certain preferred embodiments of the invention have been herein described, it will be understood that various changes and innovations can be made in the illustrated structure without departure from the principles of the invention. Changes and innovations of this type are therefor deemed to be circumscribed by the spirit and scope of the invention except as the same may be necessarily limited by the appended claims or reasonable equivalents thereof.

What is claimed is:

1. A silage bagging machine comprising:
   a chassis having a forward end and a rear end;
   an elongated silage-receiving trough mounted on the forward end portion of the chassis;
   a plurality of teeth projecting radially outwardly from said rotary drum, said teeth being arrayed in a sine wave pattern of pairs of teeth on said drum from a location adjacent one end thereof, to a location adjacent the other end thereof,
   a silage compression and shaping chamber positioned on said chassis readwardly from said rotary drum, said compression and forming chamber having:
      a retractable floor, retractable in a horizontal reciprocating motion from a first extended, bottom closure position forwardly therefrom on said chassis to a second retracted, cleanout position;
      a pair of opposed, horizontally spaced, upwardly extending vertically converging side walls; and
      a top wall;
   said compression and forming chamber having a trapezoidally-shaped cross-sectional configuration in a substantially vertical plane extending therethrough;
   a silage discharge section positioned rearwardly on said chassis from said compression and forming chamber;
   a flexible silage-receiving bag positioned in part in folds around said compression and forming chamber, and positioned in part rearwardly from said chassis and said silage discharge section for receiving silage from said discharge section, said bag including a closed end positioned rearwardly from said chassis and from said silage discharge section;
   ground-engaging wheels on said chassis rollably supporting said chassis on the ground;
   means on said chassis facilitating control of the rate of movement of said chassis away from the closed end of said bag as said bag is filled with silage;
   a pan pivotally connected to the underside of said retractable floor for pivotation about a horizontal axis, and slidably mounted on said floor for reciprocation horizontally from a position under said floor to an exposed position extending rearwardly therefrom to facilitate placement of the lower portion of said flexible, silage-receiving bag thereon to support the lower portion of the bag above the ground as said silage bagging machine is moved relative to the ground; and
   means detachably connected to said pan at a location spaced horizontally from said pivotal axis thereof to retain said pan against downward pivotation about its respective horizontal axis of pivotation whereby, when said pan is reciprocated horizontally from a position under said floor to said exposed position, said detachably connected retaining means can be detached to permit said pan to be pivoted downwardly about said horizontal axis and away from said floor to facilitate the placement of the lower portion of said flexible silage-receiving bag thereon, said floor being retractable forwardly on said chassis toward said second position while said pan with the lower portion of said bag thereon remains located beneath said silage compression and shaping chamber.

2. A silage bagging machine as defined in claim 1 wherein said means facilitating control of the rate of movement of said chassis comprises:
   at least one cable drum rotatably mounted on the chassis;
   a cable reeled upon the drum and having an end connected to an end of the bag spaced rearwardly from the chassis; and
   a brake subassembly for braking the rate of rotation of said cable drum.

3. A silage bagging machine as defined in claim 1 and further characterized as including an upwardly and rearwardly inclined material lifting step positioned centrally on said chassis at the entrance of said compression and forming chamber.

4. A silage bagging machine comprising:
   a chassis having a forward end and a rear end;
   an elongated silage-receiving trough mounted on the forward end portion of the chassis;
   a silage distributing, elongated helical auger in the trough, said elongated helical auger having a pair of oppositely turned reverse flighted blades along its length, and with the blades thereof meeting at substantially the center of its length for distributing silage laterally in opposite directions toward the opposite ends of the auger from the center thereof;
   an elongated, generally cylindrical rotary drum mounted rearwardly on the chassis from the auger for receiving silage from the auger;
   a plurality of teeth projecting radially outwardly from said rotary drum, said teeth being arrayed in a sine wave pattern of pairs of teeth on said drum from a location adjacent one end thereof, to a location adjacent the other end thereof;
   a silage compression and shaping chamber positioned on said chassis rearwardly from said rotary drum, said compression and forming chamber having:
      a floor;
      a pair of opposed, horizontally spaced, upwardly extending vertically converging side walls; and
      a top wall;
   said compression and forming chamber having a trapezoidally-shaped cross-sectional configuration in a substantially vertical plane extending therethrough;
   a silage discharge section positioned rearwardly on said chassis from said compression and forming chamber;

a flexible silage-receiving bag positioned in part in folds around said compression and forming chamber, and positioned in part rearwardly from said chassis and said silage discharge section for receiving silage from said discharge section, said bag including a closed end positioned rearwardly from said chassis and from said silage discharge section;

ground-engaging wheels on said chassis rollably supporting said chassis on the ground;

means on said chassis facilitating control of the rate of movement of said chassis away from the closed end of said bag as said bag is filled with silage;

feed conveyor means mounted at the forward end of said chassis and including a portion extending up over the central portion of said elongated helical auger, said feed conveyor means including:

an elongated housing;

an elongated, upwardly inclined silage conveyor mounted in said housing and having an upper discharge end above the helical portion of said elongated helical auger; and a generally vertically extending, adjustably movable deflector plate positioned to guide and deflect silage discharged from the upper discharge end of said silage conveyor as it falls downwardly to the auger, said deflector plate being pivotally mounted in said conveyor housing for pivotation of said deflector plate about a horizontal axis whereby said deflector plate can be selectively inclined relative to a vertical plane and thereby guide gravitating silage from the upper discharge end of said conveyor to a location along and on said elongated auger such that the auger can uniformly distribute silage laterally toward the right and toward the left at the opposite ends of the auger and thereby keep said rotor uniformly covered with silage.

5. A silage bagging machine as defined in claim 4 wherein said floor is retractable in a horizontal reciprocating motion from an extended, bottom closure position, to a retracted clean out position.

6. A silage bagging machine comprising:

a chassis having a forward end and a rear end;

an elongated silage-receiving trough mounted on the forward end of said chassis;

a silage distributing, elongated helical auger in the trough, said elongated helical auger extending laterally across said chassis and having a pair of oppositely turned, reverse flighted blades along its length, and with the blades thereof meeting substantially in the center of its length and distributing silage laterally in opposite directions toward the opposite ends of the auger from the center thereof;

an elongated, generally cylindrical rotary drum mounted rearwardly on the chassis from the auger for receiving silage from the auger;

a plurality of teeth projecting radially outwardly from said rotary drum, said teeth being arrayed in a sine wave pattern on said drum from a location adjacent one end thereof, to a location adjacent the other end thereof;

a silage compression and shaping chamber positioned on said chassis rearwardly from said rotary drum, said compression and forming chamber having:

a retractable floor, retractable in a horizontal reciprocating motion from a first extended, bottom closure position forwardly therefrom on said chassis to a second retracted, clean out position;

a pair of opposed, horizontally spaced, upwardly extending vertically converging side walls; and a top wall;

said compression and forming chamber having a trapezoidally-shaped cross-sectional configuration in a substantially vertical plane extending therethrough;

a silage discharge section positioned rearwardly on said chassis from said compression and forming chamber;

an upwardly and rearwardly inclined material lifting step positioned centrally on said chassis at the entrance of said compression and forming chamber;

a flexible silage-receiving bag positioned in part in folds around said compression and forming chamber and positioned in part rearwardly from said chassis and from said silage discharge section for receiving silage from said discharge section, said bag including a closed end positioned rearwardly from said chassis and from said silage discharge section;

ground-engaging wheels on said chassis rollably supporting said chassis on the ground;

means on said chassis facilitating the control of movement of said chassis away from the closed end of said bag as said bag is filled with silage;

feed conveyor means mounted at the forward end of said chassis and including a portion extending up over the central portion of said elongated silage-receiving trough and said elongated helical auger, said feed conveyor means including:

an elongated, upwardly inclined housing;

an elongated, upwardly inclined silage conveyor mounted in said housing and having an upper discharge end above the central portion of said elongated helical auger; and a generally vertically extending, adjustably movable deflector plate positioned to guide and deflect silage discharged from the upper discharge end of said silage conveyor as it falls downwardly to said auger, said deflector plate being pivotally mounted in said conveyor housing for pivotation of said deflector plate about a horizontal axis, whereby said deflector plate can be selectively inclined relative to a vertical plane and thereby guide gravitating silage from the upper discharge end of said conveyor to a location along, and on, said elongated auger, such that the auger can uniformly distribute silage laterally toward the right and toward the left at the opposite ends of the auger and thereby keep said rotor uniformly covered with said silage.

* * * * *

UNITED STATES PATENT AND TRADEMARK OFFICE
CERTIFICATE OF CORRECTION

PATENT NO. : 4,949,633
DATED : August 21, 1990
INVENTOR(S) : William C. Johnson and Mervin E. Aurand It is certified that error appears in the above-identified patent and that said Letters Patent is hereby corrected as shown below:

On the title page, item [73]:
The assignee, Rand Farm Systems Inc., is a Missouri corporation (instead of a Michigan corporation as typed on the title page). Please delete "Mich." and insert -Missouri-.

In Column 10, line 51, delete "o" and insert -or-.

Signed and Sealed this

Twenty-fourth Day of December, 1991

Attest:

HARRY F. MANBECK, JR.

*Attesting Officer*  *Commissioner of Patents and Trademarks*